United States Patent
Ciano et al.

(10) Patent No.: US 10,637,735 B2
(45) Date of Patent: Apr. 28, 2020

(54) PATTERN-BASED MIGRATION OF WORKLOADS

(71) Applicant: International Business Machines Corporation, Armonk, NY (US)

(72) Inventors: Giuseppe Ciano, Rome (IT); Kapuveera R. Reddy, Bangalore (IN); Hsiao-Choong Thio, Palatine, IL (US); Andre Tost, Rochester, MN (US); Sreekrishnan Venkiteswaran, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1155 days.

(21) Appl. No.: 14/836,929

(22) Filed: Aug. 26, 2015

(65) Prior Publication Data

US 2017/0063629 A1    Mar. 2, 2017

(51) Int. Cl.
*H04L 12/24* (2006.01)
*H04L 29/08* (2006.01)

(52) U.S. Cl.
CPC .......... *H04L 41/12* (2013.01); *H04L 41/0843* (2013.01); *H04L 41/16* (2013.01);
(Continued)

(58) Field of Classification Search
CPC ......... G06F 9/45558; G06F 2009/4557; G06F 9/5077; G06F 3/0647; G06F 2201/84;
(Continued)

(56) References Cited

U.S. PATENT DOCUMENTS 8,196,089 B2    6/2012  Bouchard, Sr. et al.
2008/0080526 A1    4/2008  Gounares et al.
(Continued)

OTHER PUBLICATIONS

Banerjee, Joydipto, "Moving to the Cloud: Workload Migration Techniques and Approaches", 2012, 2012 19th International Conference on High Performance Computing, all pages (Year: 2012).*
Lawrence Wilkes, "Migration Patterns for the Service Oriented Cloud", [online], [retrieved on Mar. 31, 2015], Retrieved from the internet <URL: http://everware-cbdi.com/ampsoc>, all pages.
(Continued)

*Primary Examiner* — William G Trost, IV
*Assistant Examiner* — Imran Moorad
(74) *Attorney, Agent, or Firm* — Law Offices of Ira D. Blecker, P.C.

(57) ABSTRACT

Apparatus for pattern-based migration of a source workload to a target workload at a target deployment which includes a discovery engine, a decision system, a deployment manager, a pattern deployment engine and a residual migration and remediation system. The discovery engine takes the source deployment as an input and discovers metadata associated with the deployed components of the source workload and the IT topology. The deployment manager in cooperation with the pattern deployment engine at the target determines a closest starting-point template to be used for pattern-based target workload deployment. The decision system receives the metadata from the discovery engine and in cooperation with the deployment manager makes a go or no-go decision whether to trigger pattern-based target workload. The residual migration and remediation system finds any undiscovered source workload components and deploys the undiscovered workload components to the target deployment by an image-based migration.

19 Claims, 6 Drawing Sheets

(52) U.S. Cl.
CPC .......... *H04L 67/10* (2013.01); *H04L 67/1008* (2013.01); *H04L 41/5096* (2013.01)

(58) Field of Classification Search
CPC ........ G06F 9/4856; G06F 8/63; G06F 9/5088; G06F 11/3414; H04L 41/12; H04L 41/50; H04L 67/10; H04L 67/1008
See application file for complete search history.

(56) References Cited

U.S. PATENT DOCUMENTS

| | | | |
|---|---|---|---|
| 2012/0054731 A1 | 3/2012 | Aravamudan et al. | |
| 2012/0259909 A1 | 10/2012 | Bachelor et al. | |
| 2012/0304179 A1* | 11/2012 | Devarakonda | G06Q 10/00 718/102 |
| 2012/0331114 A1* | 12/2012 | Garg | G06Q 10/00 709/220 |
| 2013/0124675 A1* | 5/2013 | Mo | G06F 9/461 709/217 |
| 2013/0346619 A1 | 12/2013 | Panuganty et al. | |
| 2014/0344123 A1* | 11/2014 | Banerjee | G06F 9/455 705/34 |
| 2016/0337480 A1* | 11/2016 | Anerousis | G06F 9/45558 |

OTHER PUBLICATIONS

"Cloud Service Provider Peak Publishes U.S. Patent for Its Innovative Layer 2 'Direct Connect' Network Topology", [online], [retrieved on Mar. 31, 2015], Retrieved from the internet <URL: http://finance.yahoo.com/news/cloud-provider-peak-publishes-u-130200780.html>, all pages.

"High Availability migration of workloads instances between different cloud service providers", IP.com No. 000240669, IP.com Electronic Publication: Feb. 17, 2015, all pages.

"Server Migration Technology Overview—Racemi", [onlline], [retrieved on Mar. 31, 2015], Retrieved from the internet <http://www.racemi.com/tech-overview/>, all pages.

"SilverSky's Cloud Migration Service", [online], [retrieved on Mar. 31, 2015], Retrieved from the internet <http://cloudmigration.silversky.com/>, all pages.

"System and methods to efficiently manage workload patterns in the Cloud.", IP.com No. 000225221 IP.com Electronic Publication: Jan. 31, 2013, all pages.

C. Ward et al., "Workload Migration into Clouds—Challenges, Experiences, Opportunities", 2010 IEEE 3rd International Conference on Cloud Computing, pp. 164-171, Jul. 5-10, 2010.

Frank Kelly, "AWS Migration Patterns", Platinum Partner, Dec. 10, 2013, <URL:https://dzone.com/articles/aws-migration-patterns>, all pages.

* cited by examiner

DEPLOYMENT OF A WORKLOAD

WHERE:
A,B,C,D,E,F ARE NODES/VERTICES; THE SET OF ALL NODES FORM THE WORKLOAD.
AB,AE,AF, ... ARE PATHS / INTER-RELATIONSHIPS

PATTERN-BASED MIGRATION OF WORKLOADS

BACKGROUND

The present exemplary embodiments pertain to migration of workloads from a source to a target and, more particularly, pertain to a pattern-based migration of workloads that accrues savings in time, labor and cost.

Today, workload migration across computer systems is primarily based on lifting and shifting code images which is labor intensive and expensive. The workload migration may be so expensive that it may be more costly than operating the computer system itself. Workload migration is one of the main hurdles to the adoption of cloud computing because it may significantly increase the total cost of ownership. This is true regardless of whether the target cloud environment is on-premise or off-premise.

BRIEF SUMMARY

The various advantages and purposes of the exemplary embodiments as described above and hereafter are achieved by providing, according to a first aspect of the exemplary embodiments, an apparatus for pattern-based migration of a source workload at a source deployment to a target workload at a target deployment comprising:
  a discovery engine to take the source deployment as an input and discover metadata associated with deployed components of the source workload and information technology topology that specifies the deployed components of the source workload, the information technology topology and service levels of the deployed patterns in the source deployment and outputs the discovered metadata in terms of separate pattern streams;
  the deployment manager in cooperation with a pattern deployment engine at the target deployment determines a closest starting-point template to be used for pattern-based target workload deployment;
  a decision system to receive the outputs from the discovery engine and in cooperation with the deployment manager make a making a go or no-go determination based on the availability of suitable starting templates for each of the pattern streams whether to trigger pattern-based target workload deployment or to default to an image-based migration; and
  a residual migration and remediation system to find any undiscovered source workload components and deploy the undiscovered workload components to the target deployment by an image-based migration.

According to a second aspect of the exemplary embodiments, there is provided a method for pattern-based migration of a source workload at a source deployment to a target workload at a target deployment comprising:
  pointing a discovery engine to the source deployment;
  discovering by the discovery engine metadata associated with deployed components of the source workload and information technology topology that specifies the deployed components of the source workload, the information technology topology and service levels of deployed patterns in the source deployment and classifying the discovered metadata in terms of separate pattern streams;
  outputting the pattern streams to a decision system;
  determining by a deployment manager in cooperation with a pattern deployment engine at the target deployment a closest starting-point template to be used for pattern-based target workload deployment;
  receiving by a decision system pattern streams from the discovery engine and in cooperation with the deployment manager making a go or no-go determination based on the availability of the closest starting-point templates for each of the pattern streams whether to trigger pattern-based target workload deployment or to default to an image-based migration;
  populating by the deployment manager parameters from the pattern streams in the closest starting-point templates for each of the pattern streams;
  provisioning the target deployment by the pattern deployment engine; and
  finding by a residual migration and remediation system any undiscovered source workload components and deploying the undiscovered workload components to the target deployment by an image-based migration;
  wherein the method is performed by one or more computing devices.

According to a third aspect of the exemplary embodiments, there is provided a computer program product for pattern-based migration of a source workload at a source deployment to a target workload at a target deployment comprising a computer readable storage medium having program instructions embodied therewith, the computer instructions executable by one or more computer devices to cause the one or more computer devices to perform the method comprising:
  pointing a discovery engine to the source deployment;
  discovering by the discovery engine metadata associated with deployed components of the source workload and information technology that specifies the deployed components of the source workload, the information technology topology and service levels of deployed patterns in the source deployment and classifying the discovered metadata in terms of separate pattern streams;
  outputting the pattern streams to a decision system;
  determining by a deployment manager in cooperation with a pattern deployment engine at the target deployment a closest starting-point template to be used for pattern-based target workload deployment;
  receiving by a decision system pattern streams from the discovery engine and in cooperation with the deployment manager making a go or no-go determination based on the availability of the closest starting-point templates for each of the pattern streams whether to trigger pattern-based target workload deployment or to default to an image-based migration;
  populating by the deployment manager parameters from the pattern streams in the closest starting-point templates for each of the pattern streams;
  provisioning the target deployment by the pattern deployment engine; and
  finding by a residual migration and remediation system any undiscovered source workload components and deploying the undiscovered workload components to the target deployment by an image-based migration.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

In the exemplary embodiments, there is provided an apparatus, method and computer program product that may build a pattern-based workflow-driven framework to achieve end-to-end workload migration in an automatic fashion.

Figure 1:
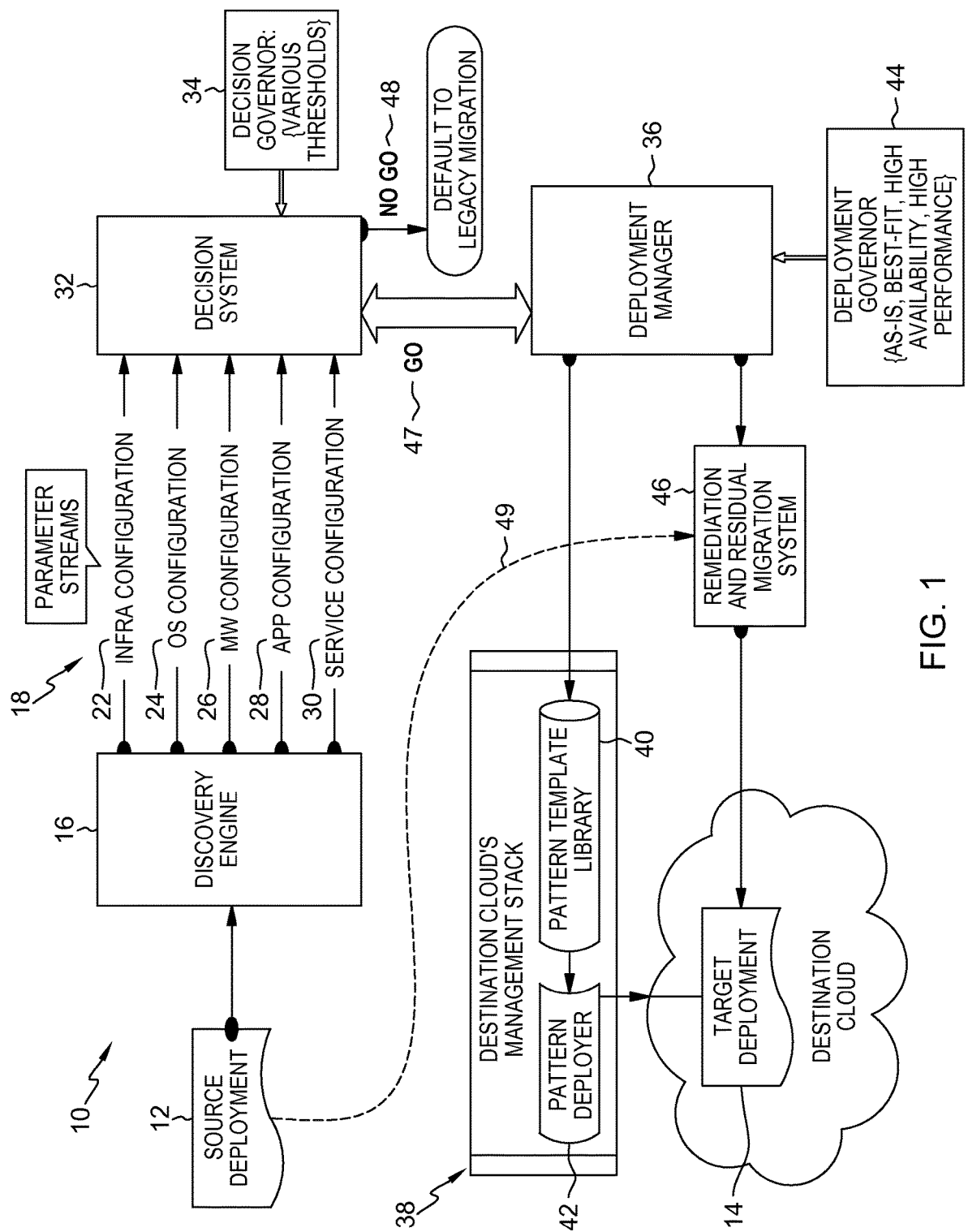
FIG. 1 is an architectural overview of the apparatus for pattern-base migration of workloads.
Figure 1A:
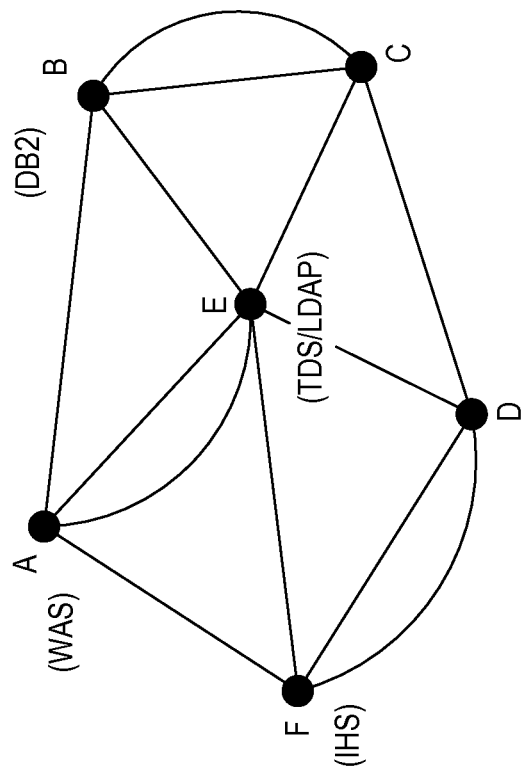
FIG. 1A is a graph of a deployment of a workload.

Referring to FIG. 1A, there is shown a graph depicting a deployment of a workload. The deployment may be a source deployment or a target deployment.

A workload is an arrangement of information technology (IT) systems that may be moved from one datacenter to another datacenter. An IT system may include hardware, operating system, middleware, applications and managed services. The datacenter may be defined as comprising code, data, storage, operating system, middleware and applications. The set of all nodes and vertices, such as those illustrated in FIG. 1A, form the workload.

Information Technology (IT) topology is an IT deployment geometry, that is, a permutation of nodes/vertices and their paths and inter-relationships. IT topology may be thought of as the layout off the workload.

Deployment is the combination of the workload and the IT topology. In other words, a deployment may be the entire graph shown in FIG. 1A.

The set of nodes/vertices and paths of the deployment aggregated across each IT stream constitute metadata that may be called patterns. Some examples of IT streams may include infrastructure, operating system, middleware, applications and managed services. Each IT stream may have its own graph. The graph shown in FIG. 1A is for a middleware IT stream.

In a pattern-based migration of a workload from a source deployment to a target deployment according to the exemplary embodiments, metadata regarding patterns including IT topology of the source workload are discovered, the patterns of the source workload are "matched" using similar patterns at the target workload and then the source workload may be automatically transferred to the target workload. The patterns may not be exactly matched but the patterns at the target workload are malleable and may be modified within limits to match the patterns of the source workload. The IT topology may be modified from the source deployment to the target deployment as necessary to accommodate the workload in the new environment of the target deployment.

Pattern-based migration of a workload is to be compared with an image-based migration of a workload which lifts and transfers code from the source to the target, layer by layer. Image-base migration of a workload is labor intensive and very expensive.

As part of a proposed process workflow, the present inventors run an analysis of the source environment and discover the patterns and including IT topology that are deployed across the infrastructure, operating system, middleware, applications and managed services of the source environment. The discovered metadata, represented as an IT pattern, is then fed into a decision engine which determines the best-fit IT pattern template suited to host the source workload on the target platform. End-to-end migration is then triggered and carried forward by the proposed workflow until the source IT deployment is provisioned on the target platform.

The exemplary embodiments may achieve automatic workload migration in a light-weight fashion. The exemplary embodiments of workload migration lead to savings in time, labor and cost as well as being simpler to implement.

Turning to the Figures in more detail, and particularly referring to FIG. 1, there is disclosed an apparatus 10 (may also be referred to as a system) for pattern-based migration of a source workload in a source deployment 12 to a target workload in a target deployment 14. For purposes of illustration and not limitation, the target deployment 14 may be a cloud-based deployment 14. In a preferred embodiment, the target deployment 14 is a cloud-based deployment. As will be explained hereafter, the target destination may be any destination that has a pattern deployment engine 38 to supply pattern templates to the apparatus 10 and have a pattern deployer. The pattern deployment engine 38 may include, for example, a pattern template library 40 and a pattern deployer 42.

The apparatus 10 may include the following components:

A discovery engine 16 to discover metadata associated with the deployed components and their IT topology and classify the metadata into different parameter streams 18. The present inventors believe the parameter streams 18 may include an infrastructure (Infra) configuration parameter stream 22, an operating system (OS) configuration parameter stream 24, a middleware (MW) configuration parameter stream 26, an applications (App) configuration parameter stream 28 and a services (Service) configuration parameter stream 30.

A decision system 32 to make go or no-go decisions on whether or not to trigger a pattern-based deployment of the target workload.

A decision governor 34 that may be integrated with the decision system 32. The decision governor 34 may provide an interface to configure thresholds for whether the loss in translation due to pattern migration is too great or the best-available starting point template in the target pattern template library 40 is too weak. That is, there are two challenging functions of the decision system 32 that make it important. The first function is that the decision system 32 has to estimate if the loss in translation due to the pattern migration is too great, beyond the threshold of acceptability. If it is, a lot of the total cost of ownership of the workload migration effort will get diverted to modifying the target deployment 14 after migration to mirror the state of the source deployment 12. So, the question that the decision governor 34 answers is: Whether the number of discovered parameters at the source deployment is FAR GREATER than the number of points of configurability in the candidate chosen by the deployment manager 36 from the target pattern template library 40 at the target. This first number is the threshold for a loss in translation. The second function is that the decision system 32 has to estimate if the best-available starting point template in the target pattern template library 40 is too weak. So, the next question that the decision system has to address is: Whether the number of discovered parameters at the source is MUCH LESS than the number of points of configurability in the candidate pattern chosen from the target pattern template library. This second number is the threshold for a weak template. The thresholds are configured by the decision governor 34 and fed as an input to the decision support system 32.

The decision system 32 interacts with a deployment manager 36. The deployment manager 36 may calculate the closest template in the pattern template library 40 that is part of the target pattern deployment engine 38 at the target. The deployment manager 36 may trigger the pattern deployer 42 of the pattern deployment engine 38 at the target to effect deployment of the target workload 14.

A deployment governor 44 is integrated with the deployment manager 36 to optionally allow the user to specify digital alteration of the discovered topology to introduce new functions such as high availability (HA) on the target deployment.

Lastly, there may be a remediation and residual migration system 46 to perform residual migration of those components of the source deployment that are pattern payloads (e.g., applications) and perform the final remediation necessary to move the state of the target deployment 14 to match that of the source deployment 12. If metadata of certain parameter streams have not been discovered to the extent necessary to migrate them in by pattern-based migration, those parameter streams may have to revert to image-based migration. For example, it is possible that a middleware layer (for example, an application service) may be discovered completely, but the application layer (the application deployed by the application service) may not be discovered. In this case, pattern-based migration may be leveraged to migrate the middleware layer while the application layer may migrated "manually" via image-based migration.

Each of the components of the apparatus 10 may now be described in more detail.

Discovery Engine:

The discovery engine 16 takes the source deployment 12 as an input and discovers metadata associated with the deployed components of the source workload and their IT topology. The discovery engine then produces a classified form factor of the discovered metadata in terms of the several parameter streams 18 associated with infrastructure 22, operating system 24, middleware 26, applications 28, and managed services 30. "Classified form factor" means that the source deployment input is extracted into streams of the multiple categories infrastructure 22, operating system 24, middleware 26, applications 28, and managed services 30. It should be understood that there may be other embodiments where the parameter streams may differ from infrastructure 22, operating system 24, middleware 26, applications 28, and managed services 30.

The discovery process performed by the discovery engine 16 gleans patterns in the form of metadata including but not limited to patterns pertaining to nodes+paths+inter-relationships+OS/MW/App deployment modes+node configurations+service levels at the five parameter streams 18.

An infrastructure pattern may be the hardware components and how the hardware components are connected. An operating system pattern may be an operating system and how the operating system is connected with other software such as an operating system cluster that includes components such as compute and shared disks. A middleware pattern may be middleware components and how they are connected such as an application server+database+web server combination in a high availability configuration. An application pattern may be a set of related application components (e.g., Microsoft Office) deployed on top of a middleware pattern. Managed services may be services performed by the workload, for example, how monitoring and patching of applications is done; how backup is performed; or how the workload is handled during disaster and disaster recovery.

The metadata discovered by the discovery engine 16 is output to the decision system 32 in the parameter streams 18.

Decision System:

The decision support system receives the parameter streams 18 as an input and makes a go decision 47 or no-go decision 48 on whether or not to trigger pattern-based deployment on the target computer system. The decision is based on:

whether the deployment manager 36 is able to pick a member of the pattern template library 40 in the pattern deployment engine 38 as the starting point pattern template candidate for target deployment for each of the parameter streams 18;

whether the number of discovered parameters of the source deployment parameters is greater than the number of points of configurability in the starting point pattern template candidate chosen from the pattern template library 40, by a pre-determined threshold configured with the decision governor 34 (the estimated losses in translation are too great); and whether the number of discovered parameters of the source deployment parameters is less than the number of points of configurability in the starting point pattern template candidate chosen from the pattern template library 40, by a pre-determined threshold configured with the decision governor 34 (the starting point in the pattern template library is too weak).

Each of the above (i.e., insufficient starting point pattern template candidate, excessive losses in translation or weak pattern template) may lead to a no-go decision. Conversely, sufficient starting point pattern template candidate, low (less than threshold) or no loss in translation and nonweak (less than threshold) may lead to a go-decision.

The patterns in the pattern template library 40 are malleable within limits in that they may be modified by the decision system 32 to match the patterns of the source deployment 12.

Each of the parameter streams 18 may be processed serially or in parallel by the decision system 32. However, before the decision system 32 may make a go or no-go decision, all of the parameter streams 18 will have to be processed. All parameter streams 18 must have a go decision in order for the workload of the source deployment 12 to be migrated by pattern-based migration to the target deployment 14. If processing of any of the parameter streams 18 results in a no-go decision for that parameter stream, then the migration of the source workload defaults to a legacy migration such as image-based migration.

Decision Governor:

Policies in the decision governor 34 define rules that set the thresholds for the decision support system 32 as described above.

Deployment Governor:

The deployment governor 44 may employ a set of policies to digitally alter the source deployment and introduce IT topology variations to achieve features in the target deployment 14. As an example, usually a development-test workload deployment does not have High Availability since the workloads are not critical, while production workloads are Highly Available since the workloads are critical. Thus, the workload of the source deployment 12 may be modified from "development-test" to "High Availability".

Example policy modes supported by the deployment governor may include but not be limited to:
As-is: "clone" discovered deployment;
Best Fit: Optimize: select the pattern with the minimum number of nodes;
High Availability (HA) Pattern: introduce HA wherever applicable—for example, Websphere Application Server deployment templates usually allow HA modes;
High Performance;
Custom: Additional migration policies may be added and extended based on customer need.
Deployment Manager:

Based on the metadata that is input and the governance policy that is configured in the deployment governor 44, the deployment manager 36 may calculate the closest template in the pattern template library 40 that is part of the pattern deployment engine 38.

For the chosen template, the deployment manager 36 populates the required parameters based on the discovered configurations from the discovery engine 16. The deployment manager 36 may then trigger the pattern deployer 42 that is part of the pattern deployment engine 38 to provision the target workload 14. Finally, the deployment manager 36 triggers any residual migration and remediation from the remediation and residual migration system 46.
Remediation and Residual Migration System:

The remediation and residual migration system 46 may discover components, indicated by arrow 49, that are part of the source deployment 12 but were not discovered by the discovery engine 16. These newly discovered components may be migrated by image-based migration on top of the pattern-based migration of the workload from the source deployment to the target deployment.

The remediation and residual migration system 46 may perform final remediation necessary to match the state of the workload of the target deployment 14 to that of the workload of the source deployment 12.

Figure 2:
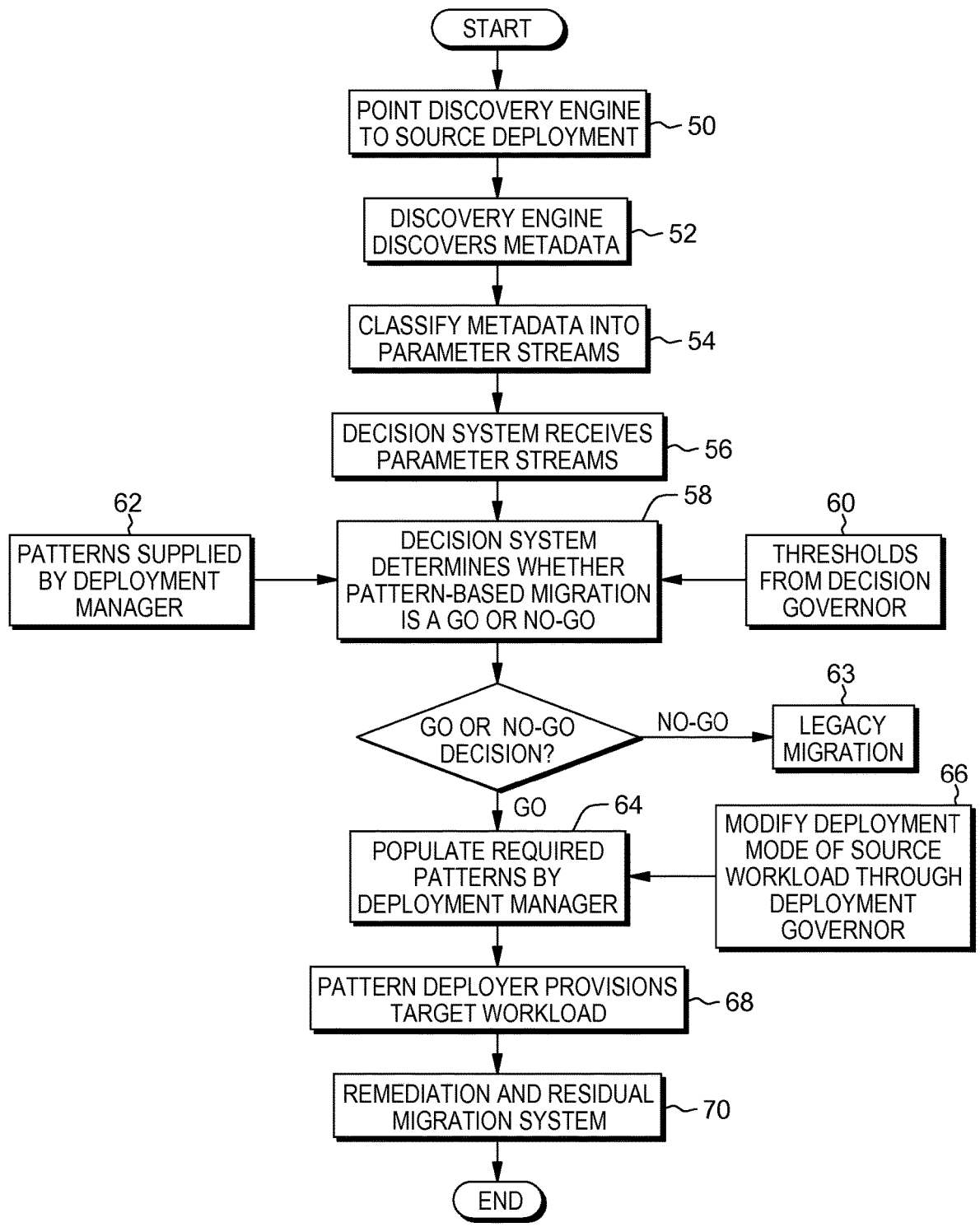
FIG. 2 is a workflow for practicing the apparatus for pattern-based migration.

Referring now to FIGS. 1 and 2, there is illustrated a work flow chart for practicing the exemplary embodiments. Initially, the discovery engine 16 is "pointed" to the source deployment 12, box 50.

Then, the discovery engine 16 discovers the metadata associated with the deployed components and their IT topology, box 52. When the discovery engine 16 is pointed to the source deployment 12, the discovery engine 16 "discovers" the source topology in various dimensions/streams. The discovery engine 16 would typically smartly wade/worm through the source topology, discovering metadata/pattern information on the way. This could be agent-based where there may be a discovery server external to the source deployment 12 talking to "agents" that are discovered on each server in the to-be-discovered source environment. Or it could be agent-less where the discovery server is smart and can self-navigate the source topology without assistance from "agent software". The metadata is classified into the parameter streams 18 as an output from the discovery engine 16, box 54.

The decision system 32 receives the parameter streams 18 as an input, box 56.

Thereafter, the decision system 32 determines whether pattern-based migration is a go decision 46 or a no-go decision 48, box 58. The decision system 32 may receive threshold input (as described previously) from the decision governor 34, box 60, as well as starting patterns supplied by the deployment manager 36 from the pattern template library 40, box 62. Having the threshold input and the starting patterns, the decision system 32 may then decide whether pattern-based migration is a go decision 46 or a no-go decision 48, box 58.

If the decision from the decision system 32 is a no-go decision, the workflow follows the right branch "NO-GO" to default to the legacy migration, box 63. If the decision from the decision system 32 is a go-decision, the workflow proceeds down "GO" to the next process step.

In a next process, the deployment manager 36 populates the required parameters from the separate parameter streams in the template patterns based on the discovered configurations from the discovery engine 16, box 64. As an input to the deployment manager 36, the deployment governor 44 may employ a set of policies to digitally alter the source workload and introduce IT topology variations to achieve certain desired features in the target deployment, box 66.

Thereafter, as indicated by box 68, the deployment manager 36 may trigger the pattern deployer 42 that is part of the pattern deployment engine 38 to provision the target workload 14 with the template patterns for the target workload 14.

Figure 3:
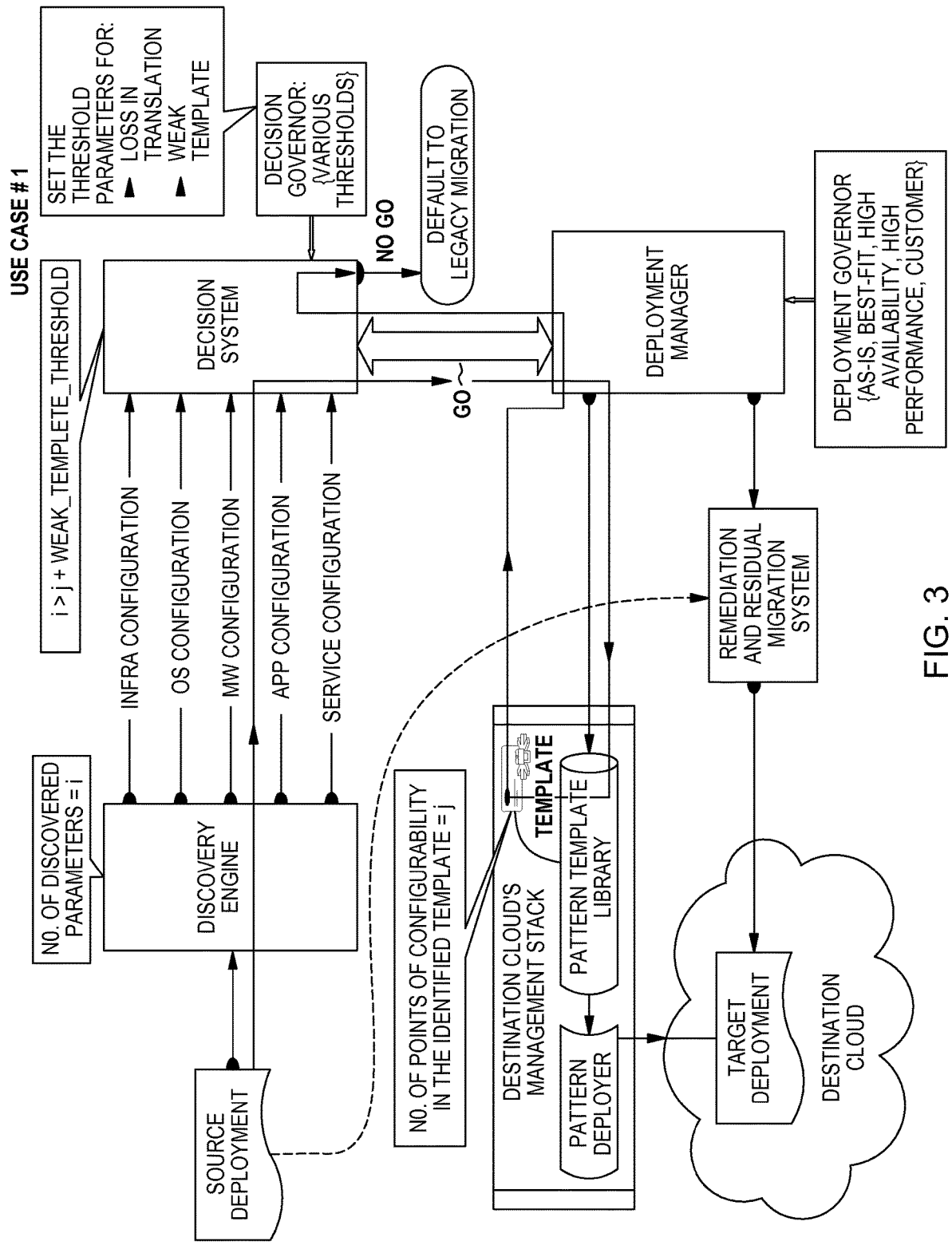
FIG. 3 illustrates a first use case for practicing the apparatus for pattern-based migration.
Figure 4:
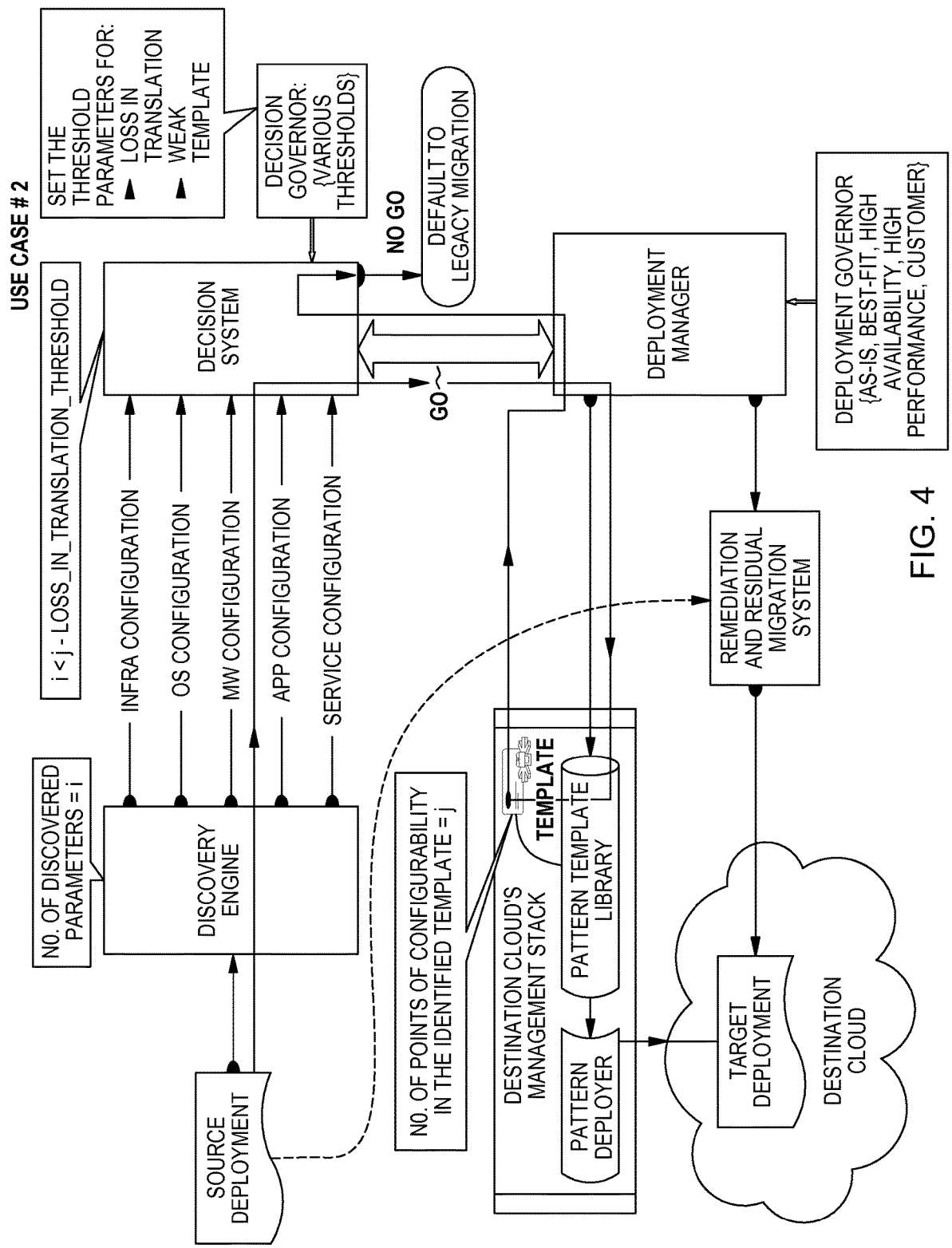
FIG. 4 illustrates a second use case for practicing the apparatus for pattern-based migration.
Figure 5:
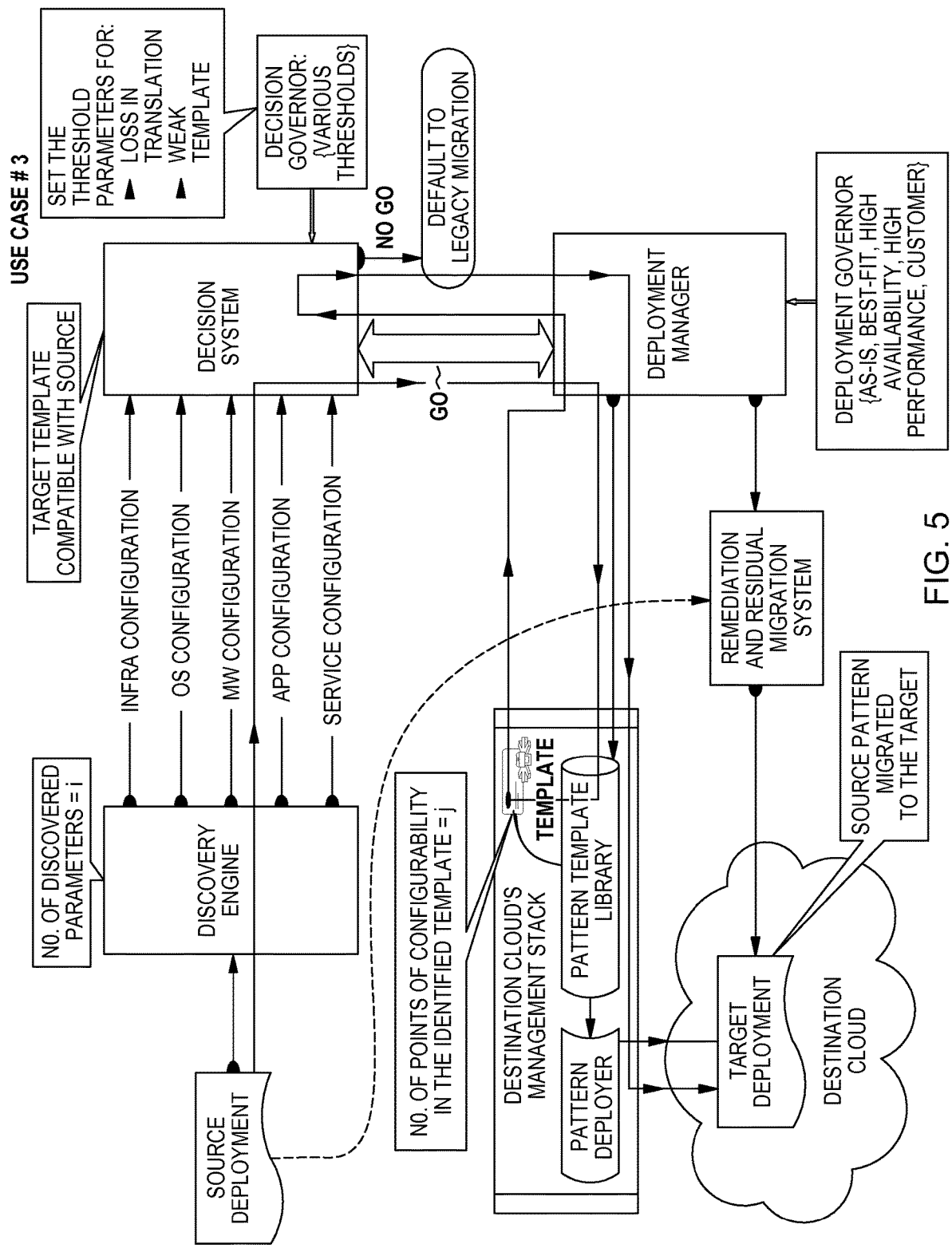
FIG. 5 illustrates a third use case for practicing the apparatus for pattern-based migration.

Finally, the deployment manager 36 may trigger any residual migration and remediation from the remediation and residual migration unit 46, box 70. The remediation and residual migration system 46 may perform final remediation necessary to match the state of the workload of the target deployment 14 to that of the workload of the source deployment 12.
Example Use Cases:
Use Case #1:

In use case #1 illustrated in FIG. 3, the number of discovered parameters are greater than the number of points of configurability "j" in the identified starting pattern template chosen by the decision system. According to the threshold value set by the decision governor, the difference between the discovered parameters "i" and the number of points of configurability "j" in the identified starting pattern template chosen by the decision system is greater than the threshold value. Therefore, the starting template will result in a loss in translation and the result is a no-go decision.
Use Case #2:

In use case #2 illustrated in FIG. 4, the number of discovered parameters "i" is less than the number of points of configurability "j" in the identified starting pattern template chosen by the decision system. According to the threshold value set by the decision governor, the difference between the discovered parameters "i" and the number of points of configurability "j" in the identified starting pattern template chosen by the decision system is greater than the threshold value. Therefore, the starting template is a weak template and the result is a no-go decision.
Use Case #3:

In use case #3 illustrated in FIG. 5, the number of discovered parameters "i" is about equal to the number of points of configurability "j" in the identified starting pattern template chosen by the decision system. According to the threshold value set by the decision governor, the difference between the discovered parameters "i" and the number of points of configurability "j" in the identified starting pattern template chosen by the decision system is less than the threshold value. Therefore, the starting template meets the requirements for a go decision.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. Apparatus for pattern-based migration of a source workload at a source deployment to a target workload at a target deployment comprising:
   a non-transitory storage medium that stores instructions; and
   a processor that executes the instructions to perform the following functions:
      a discovery engine to take the source deployment as an input and discover metadata associated with deployed components of the source workload and their information technology topology that specifies the deployed components of the source workload and paths and inter-relationships of the deployed components and outputs the discovered metadata in terms of separate pattern streams, each pattern stream comprising a plurality of metadata;
      the deployment manager in cooperation with a pattern deployment engine at the target deployment determines a closest starting-point template to be used for pattern-based target workload deployment;
      a decision system to receive the outputs from the discovery engine and in cooperation with the deployment manager make a go or no-go determination based on the availability of suitable starting templates for each of the pattern streams whether to trigger pattern-based target workload deployment or to default to an image-based migration wherein pattern-based target workload deployment is triggered only when a go determination is made for each of the pattern streams; and
      a residual migration and remediation system to determine whether the metadata discovered in the source workload carry any undiscovered source workload components not discovered as pattern metadata to find any undiscovered source workload components, to migrate the undiscovered source workload components to the target deployment by an image-based migration, to configure the undiscovered source workload components on top of the target deployment and to perform final remediation necessary to migrate the state of the target workload deployment to match that of the source workload deployment;
      wherein the source deployment is deployed to the target deployment including modifications to the information technology topology to accommodate the workload in the target deployment.

2. The apparatus of claim 1 wherein the separate pattern streams are associated with an infrastructure configuration including hardware components and how the hardware components are connected, an operating system configuration including an operating system and how the operating system is connected with other software, a middleware configuration including middleware components and how the middleware components are connected, applications configuration and managed service configuration of the deployed source workload.

3. The apparatus of claim 1 further comprising a decision governor integrated with the decision support system that provides an interface to configure thresholds for a difference between the pattern streams and the starting templates as a result of the proposed method of migration, and feeds it as an input to the decision system.

4. The apparatus of claim 1 further comprising a deployment governor integrated with the deployment manager to allow the specification of digital alteration of the discovered IT topology of each pattern stream to introduce new functions into the target workload.

5. The apparatus of claim 1 wherein the decision support system determines the feasibility of pattern-based migration depending on whether the deployment manager is able to find a member of the pattern template library on the target pattern deployment engine that can be the starting point of pattern-based deployment of the target workload.

6. The apparatus of claim 1 wherein the deployment manager populates required parameters from the parameter streams to the chosen pattern template based on the discovered configurations, and commands the target pattern deployment engine to provision the target workload.

7. The apparatus of claim 1 wherein the target deployment is a cloud computing system.

8. A method for pattern-based migration of a source workload at a source deployment to a target workload at a target deployment comprising:
   pointing a discovery engine to the source deployment;
   discovering by the discovery engine metadata associated with deployed components of the source workload and information technology topology that specifies the deployed components of the source workload and paths and inter-relationships of the deployed components and classifying the discovered metadata in terms of separate pattern streams, each pattern stream comprising a plurality of metadata;
   outputting the pattern streams to a decision system;
   determining by a deployment manager in cooperation with a pattern deployment engine at the target deployment a closest starting-point template to be used for pattern-based target workload deployment;
   receiving by a decision system pattern streams from the discovery engine and in cooperation with the deployment manager making a go or no-go determination based on the availability of the closest starting-point templates for each of the pattern streams whether to trigger pattern-based target workload deployment or to default to an image-based migration wherein pattern-based target workload deployment is triggered only when a go determination is made for each of the pattern streams;
   populating by the deployment manager parameters from the pattern streams in the closest starting-point templates for each of the pattern streams;
   provisioning the target deployment by the pattern deployment engine; and
   determining by a residual migration and remediation system whether the metadata discovered in the source workload carry any undiscovered source workload components not discovered as pattern metadata to find any undiscovered source workload components, migrating the undiscovered workload components to the target deployment by an image-based migration, configuring the undiscovered source workload components on top of the target deployment and performing final remediation necessary to migrate the state of the target workload deployment to match that of the source workload deployment;
   wherein the source deployment is deployed to the target deployment including modifications to the information technology topology to accommodate the workload in the target deployment; and
   wherein the method is performed by one or more computing devices.

9. The method of claim 8 wherein the separate pattern streams are associated with an infrastructure configuration including hardware components and how the hardware components are connected, an operating system configuration including an operating system and how the operating system is connected with other software, a middleware configuration including middleware components and how the middleware components are connected, applications configuration and managed service configuration of the deployed source workload.

10. The method of claim 8 further comprising configuring by a decision governor thresholds for a difference between the pattern streams and the starting templates as a result of the proposed method of migration, and feeding the thresholds as an input to the decision system.

11. The method of claim 8 further comprising digitally altering by a deployment governor integrated with the deployment manager the discovered IT topology of each pattern stream to introduce new functions into the target workload.

12. The method of claim 8 further comprising performing by the residual migration and remediation system final remediation necessary to move a state of the target workload deployment to match that of the source workload deployment.

13. The method of claim 8 wherein the target deployment is a cloud computing system.

14. A computer program product for pattern-based migration of a source workload at a source deployment to a target workload at a target deployment comprising a computer readable storage medium having program instructions embodied therein, the computer instructions executable by one or more computer devices to cause the one or more computer devices to perform the method comprising:
 pointing a discovery engine to the source deployment;
 discovering by the discovery engine metadata associated with deployed components of the source workload and information technology topology that specifies the deployed components of the source workload and paths and inter-relationships of the deployed components and classifies the discovered metadata in terms of separate pattern streams, each pattern stream comprising a plurality of metadata;
 outputting the pattern streams to a decision system;
 determining by a deployment manager in cooperation with a pattern deployment engine at the target deployment a closest starting-point template to be used for pattern-based target workload deployment;
 receiving by a decision system pattern streams from the discovery engine and in cooperation with the deployment manager making a go or no-go determination based on the availability of the closest starting-point templates for each of the pattern streams whether to trigger pattern-based target workload deployment or to default to an image-based migration wherein pattern-based target workload deployment is triggered only when a go determination is made for each of the pattern streams;
 populating by the deployment manager parameters from the pattern streams in the closest starting-point templates for each of the pattern streams;
 provisioning the target deployment by the pattern deployment engine; and
 determining by a residual migration and remediation system whether the metadata discovered in the source workload carry any undiscovered source workload components not discovered as pattern metadata to find any undiscovered source workload components, migrating the undiscovered workload components to the target deployment by an image-based migration, configuring the undiscovered source workload components on top of the target deployment and performing final remediation necessary to migrate the state of the target workload deployment to match that of the source workload deployment;
wherein the source deployment is deployed to the target deployment including modifications to the information technology topology to accommodate the workload in the target deployment.

15. The computer program product of claim 14 wherein the separate pattern streams are associated with an infrastructure configuration including hardware components and how the hardware components are connected, an operating system configuration including an operating system and how the operating system is connected with other software, a middleware configuration including middleware components and how the middleware components are connected, applications configuration and managed service configuration of the deployed source workload.

16. The computer program product of claim 14 further comprising configuring by a decision governor thresholds for a difference between the pattern streams and the starting templates as a result of the proposed method of migration, and feeding the thresholds as an input to the decision system.

17. The computer program product of claim 14 further comprising digitally altering by a deployment governor integrated with the deployment manager the discovered IT topology of each pattern stream to introduce new functions into the target workload.

18. The computer program product of claim 14 further comprising performing by the residual migration and remediation system final remediation necessary to move a state of the target workload deployment to match that of the source workload deployment.

19. The computer program product of claim 14 wherein the target deployment is a cloud computing system.

* * * * *